US006415851B1

(12) United States Patent
Hall et al.

(10) Patent No.: US 6,415,851 B1
(45) Date of Patent: Jul. 9, 2002

(54) MULTI-ZONE TEMPERATURE CONTROL SYSTEM FOR HVAC AIR-HANDLING ASSEMBLY

(75) Inventors: Timothy J. Hall, Novi; James Fantin, Troy, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/469,051

(22) Filed: Dec. 21, 1999

(51) Int. Cl.$^7$ ................................................. B60H 3/00
(52) U.S. Cl. .......................... 165/42; 454/144; 454/152; 454/161
(58) Field of Search ............................ 165/41, 42, 201, 165/202; 454/69, 75, 141, 142, 143, 144, 145, 152, 162, 161

(56) References Cited

U.S. PATENT DOCUMENTS

| | | | | |
|---|---|---|---|---|
| 1,446,725 A | * | 2/1923 | Shamberg .................... | 454/144 |
| 2,175,280 A | * | 10/1939 | Paton .......................... | 454/75 |
| 2,674,175 A | * | 4/1954 | Backe .......................... | 454/142 |
| 3,550,522 A | * | 12/1970 | Bauer et al. ................. | 454/144 |
| 3,724,357 A | * | 4/1973 | Kavthekar et al. .......... | 454/152 |
| 4,512,239 A | * | 4/1985 | Watanabe et al. ........... | 454/144 |
| 5,042,566 A | * | 8/1991 | Hildebrand .................. | 165/42 |
| 5,042,567 A | * | 8/1991 | Kajimoto et al. ............ | 165/42 |
| 5,052,283 A | * | 10/1991 | Altus ........................... | 454/144 |
| 5,267,896 A | * | 12/1993 | Petters et al. ............... | 165/42 X |
| 5,277,038 A | * | 1/1994 | Carr ............................. | 165/42 X |
| 5,673,694 A | * | 10/1997 | Roan et al. .................. | 454/161 X |
| 5,752,566 A | | 5/1998 | Liu et al. | |
| 5,902,181 A | * | 5/1999 | Bain ............................ | 454/144 |
| 6,019,288 A | * | 2/2000 | Arold et al. ................. | 454/152 X |
| 6,036,594 A | * | 3/2000 | Kwon et al. ................. | 165/202 X |
| 6,206,776 B1 | * | 3/2001 | Weindorf ..................... | 454/143 |

FOREIGN PATENT DOCUMENTS

| | | | | |
|---|---|---|---|---|
| DE | 30 12 052 A1 | * | 10/1981 | ................ 455/161 |
| JP | 58-199211 | * | 11/1983 | ................ 454/144 |

OTHER PUBLICATIONS

SAE Recommended Practice, "Passenger Car Glazing Shade Bands–SAE J100", Mar. 1988.

* cited by examiner

Primary Examiner—Ljiljana Ciric
(74) Attorney, Agent, or Firm—Larry I. Shelton

(57) ABSTRACT

A multi-zone temperature control system for an HVAC air-handling assembly in a climate control system on a vehicle includes a cold air supply duct and a hot air supply duct operatively coupled to the cold air supply duct. The multi-zone temperature control system also includes a rear air duct operatively coupled to the hot air supply duct and a temperature blend door disposed within the hot air supply duct to adjust a temperature of air flowing through the rear air duct into the vehicle.

13 Claims, 5 Drawing Sheets

MULTI-ZONE TEMPERATURE CONTROL SYSTEM FOR HVAC AIR-HANDLING ASSEMBLY

BACKGROUND OF THE INVENTION

1. Field of the Invention

The present invention relates generally to a climate control system and, more specifically, to a multi-zone temperature control system for an HVAC air-handling assembly in a climate control system on a vehicle.

2. Description of the Related Art

A vehicle, such as an automotive vehicle, includes a climate control system, which maintains a temperature within an occupant compartment of the vehicle at a comfortable level by providing heating, cooling and ventilation. Occupant compartment comfort is accomplished by an integrated mechanism referred to in the art as a heating, ventilation and air conditioning (HVAC) air-handling assembly. The HVAC air-handling assembly conditions a flow of air and distributes the conditioned air throughout the occupant compartment.

Vehicle occupants prefer personalized comfort within the occupant compartment, as provided by individualized temperature control. To accomplish individualized temperature control of the occupant compartment, the occupant compartment is divided into independent temperature control zones, referred to in the art as multi-zone temperature control. For example, one zone is the front driver-side portion of the vehicle. This zone can be subdivided into a front driver-side and a front passenger-side zone. Another zone is the rear passenger portion of the vehicle, and this zone can be further subdivided into a right and left side. Preferably, the temperature within each zone is independently controlled. As is known in the art, dual-zone temperature control refers to independent temperature control of two zones. Similarly, tri-zone temperature control refers to independent temperature control of three zones.

In the past, multi-zone temperature control was provided by an auxiliary HVAC air-handling assembly for the rear zone in the vehicle. While an auxiliary rear HVAC air-handling assembly works well, it is costly and requires significant packaging space. Multi-zone temperature control has also been provided by partitioning a case for the HVAC air-handling assembly into multiple chambers corresponding to the independent temperature zones. While this method also works, it suffers the disadvantage that a unique HVAC air-handling assembly case is required for each type of system, such as single zone, dual zone or tri-zone. Thus, there is a need in the art for a multi-zone temperature control system for a climate control system in a vehicle that can be added onto a common HVAC air-handling assembly.

SUMMARY OF THE INVENTION

Accordingly, the present invention is a multi-zone temperature control system for an HVAC air handling assembly. The multi-zone temperature control system includes a cold air supply duct and a hot air supply duct operatively coupled to the cold air supply duct. The multi-zone temperature control system also includes a rear air duct operatively coupled to the hot air supply duct and a temperature blend door disposed within the hot air supply duct to adjust a temperature of air flowing through the rear air duct into the vehicle.

One advantage of the present invention is that a multi-zone temperature control system for a climate control system on a vehicle is provided that offers individualized temperature control for the rear zone of the vehicle. Yet another advantage of the present invention is that a multi-zone temperature control system is provided that can be added onto a common HVAC air-handling assembly. Still another advantage of the present invention is that a multi-zone temperature control system is provided that is cost-effective to manufacture and install within a vehicle. A further advantage of the present invention is that a multi-zone temperature control system is provided that can be adapted to be used with a variety of vehicle types.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
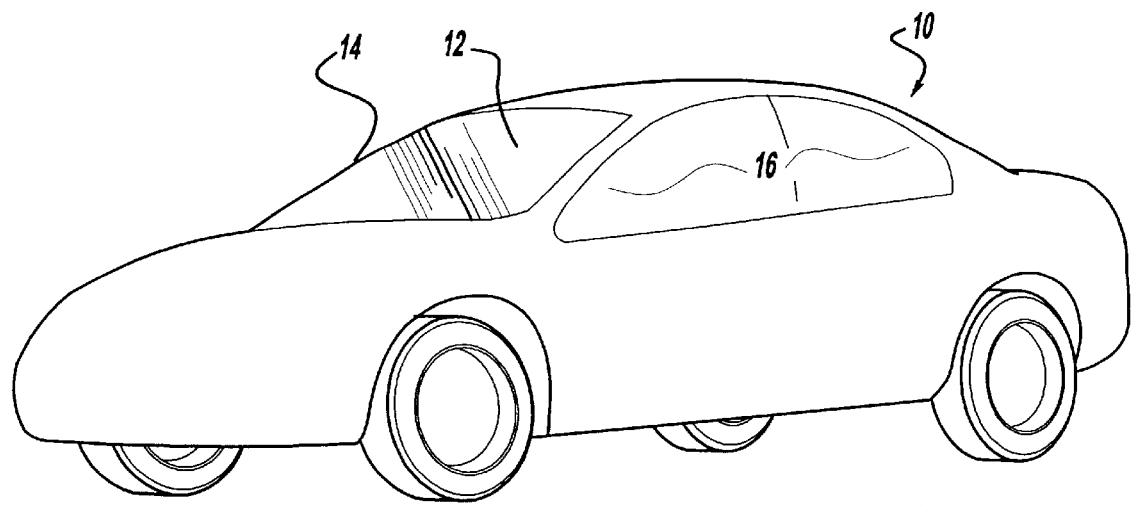
FIG. 1 is a perspective view of a vehicle incorporating the HVAC air-handling, assembly of FIG. 1.
Figure 2:
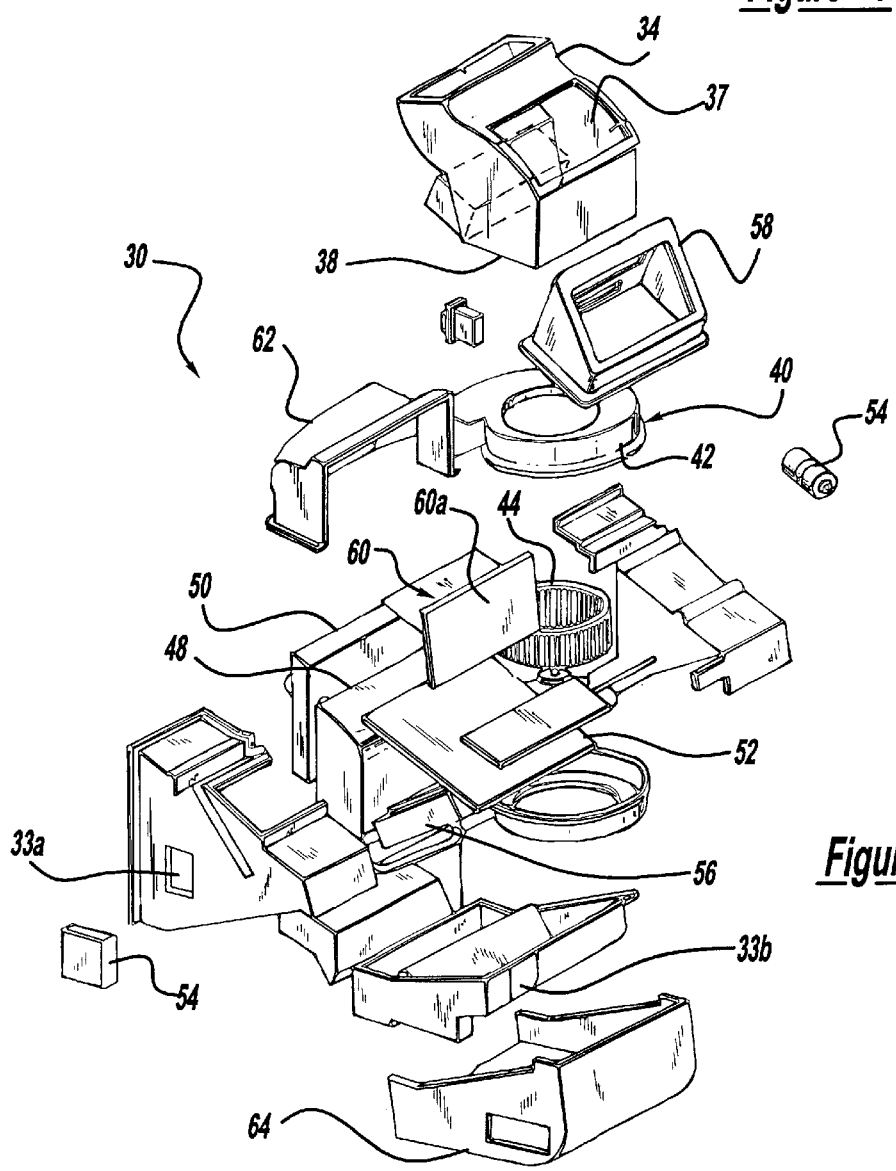
FIG. 2 is an exploded view of an HVAC air-handling assembly for a climate control system in a vehicle.
Figure 3:
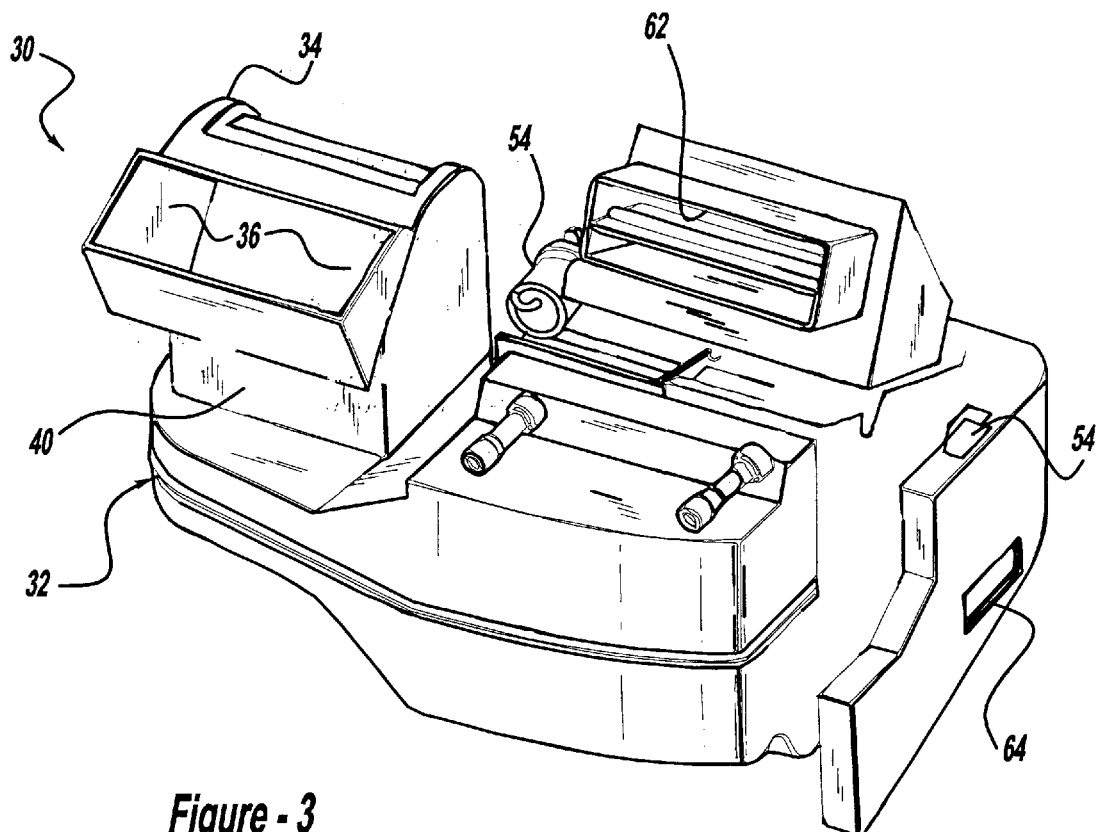
FIG. 3 is a perspective view of the HVAC air-handling assembly of FIG. 1.
Figure 4:
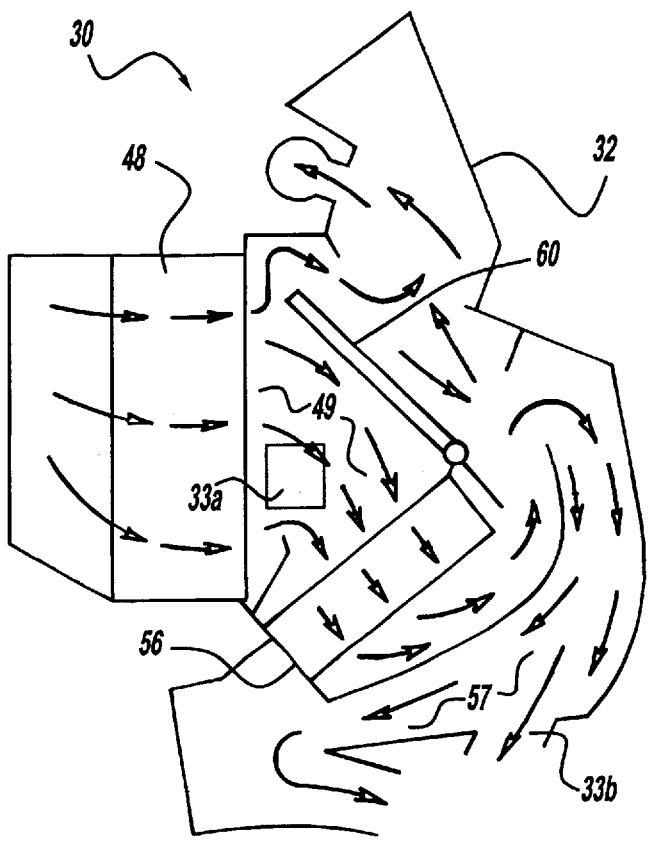
FIG. 4 is a sectional view taken along line 4—4 of the HVAC air-handling assembly of FIG. 3.
Figure 5:
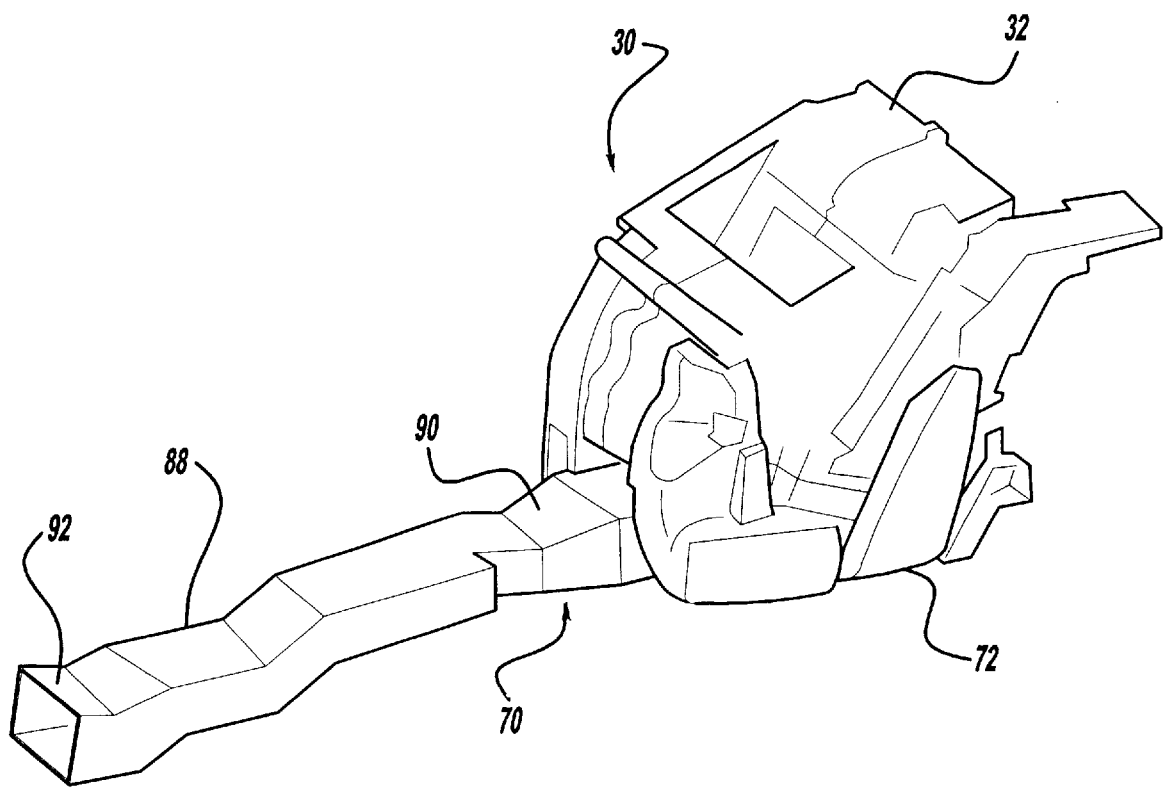
FIG. 5 is a perspective view of a multi-zone temperature control system, according to the present invention, for the HVAC air-handling assembly of FIGS. 2 and 3.
Figure 6:
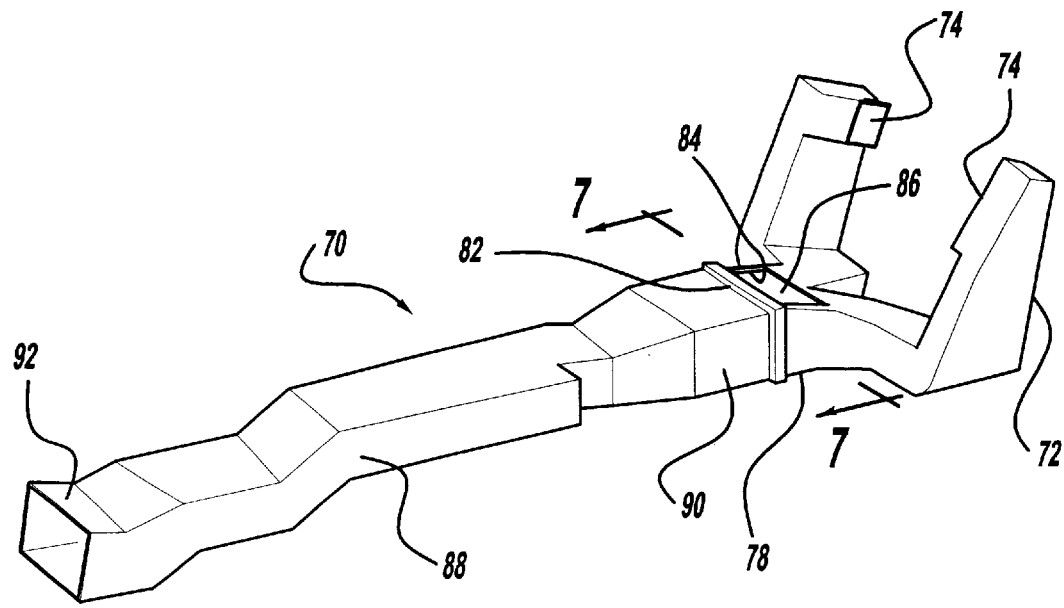
FIG. 6 is a perspective view of a portion of the multi-zone temperature control system of FIG. 5.

Referring to FIGS. 1 through 4, one embodiment of an HVAC air-handling assembly 30 for a climate control system (not shown) on a vehicle 10 is illustrated. The climate control system generally provides for heating, ventilation and air conditioning of an occupant compartment 12 of the vehicle 10. Advantageously, the climate control system provides for a comfortable interior temperature of the occupant compartment 12, and good visibility through a windshield 14 and other windows 16 of the vehicle 12. It should be appreciated that the interior temperature of the vehicle 10 may be affected by factors such as occupant compartment temperature, ambient temperature, sunload, external air flow and heat radiation.

The climate control system also includes an air-flow handling system, referred to in the art as the heating, ventilation and air conditioning (HVAC) air-handling assembly 30. It should be appreciated that, in this embodiment, the thermal management of the heating, cooling and ventilation functions is integrated into one system. The HVAC air-handling assembly 30 conditions a flow of air by heating or cooling the airflow and distributing the flow of conditioned air to the interior of the occupant compartment 12 of the vehicle 10. It should be appreciated that, in this embodiment, the HVAC air-handling assembly 30 is positioned on the occupant compartment 12 side of a dash panel (not shown) and below an instrument panel (not shown). Also, in this embodiment, the HVAC air-handling assembly 30 includes a case 32, having a preferred architecture, to package the individual component parts of the HVAC air-handling assembly 30 to be described.

The HVAC air-handling assembly 30 includes an air inlet duct 34. The air inlet duct 34 includes an interior chamber (not shown) that is hollow, for receiving air to be conditioned. The air inlet duct 34 includes an inlet opening to allow the ingress of air to be conditioned into the interior chamber. The air inlet duct 34 receives air from outside of the vehicle 10, or recirculated air from inside the occupant compartment 12 of the vehicle 10.

In this embodiment the HVAC air-handling assembly 30 includes an outside air inlet opening 36 for receiving outside air, such as through a vent located near a windshield 14 of the vehicle 10 and a recirculated air inlet opening 37 for receiving recirculated air from the occupant compartment 12. Preferably, the openings 36,37 are covered by a door (not shown) that operatively controls the ingress of air. The door is actuable between multiple positions, including one hundred percent outside air and no recirculated air, one hundred percent (100%) recirculated air and no outside air, and a mixture of outside air and recirculated air. It should be appreciated that the size of the air inlet duct 34 and position relative to the case 32 is part of an HVAC air handling assembly architecture. The air inlet duct 34 also includes an egress opening 38 for the air to leave the interior chamber of the air inlet duct 34.

The HVAC air-handling assembly 30 also includes a blower assembly 40 operatively connected to the egress opening 38 in the air inlet duct 34. The blower assembly 40 pulls air through the air inlet duct 34 and forces it through the rest of the HVAC air-handling assembly 30, in a manner to be described. The blower assembly 40 includes a scroll housing 42 having a wheel 44 and a motor 46, as is known in the art. Preferably, the motor 46 is part of a centrifugal blower function for the blower assembly 40.

The HVAC air-handling assembly 30 further includes an evaporator core 48 operatively connected to the blower assembly 40, that receives the flow of air to be conditioned. Depending on the operational mode selected, the flow of air to be conditioned is either outside air or recirculated air from the occupant compartment 12. It should be appreciated that, in this embodiment, there is a filter 50 positioned between the blower assembly 40 and the evaporator core 48, to filter the air before it passes through the evaporator core 48. The evaporator core 48 cools and dehumidifies the air to be conditioned, by the thermodynamic transfer of heat from the air to be conditioned to a refrigerant, as is known in the art. The conditioned cooled air exits the evaporator core 48 and is received into a first chamber 47 within the HVAC air-handling assembly 30. The conditioned, cooled air is distributed in a manner to be described. It should be appreciated that a wall of the HVAC case 32 may have an opening 33a to provide access to the first chamber 47, for a function to be described.

The HVAC air-handling assembly 30 also includes a blend door 52 that diverts the flow of conditioned air leaving the evaporator core 48 to adjust the temperature of the air, depending on the selected operational and temperature modes. It should be appreciated that the blend door 52 may be actuated by an actuator 54. The actuator 54 may be electrically operated, mechanically operated, or vacuum operated, as is known in the art. The blend door 52 directs the flow of air either into a heater core 56, to be described, or to bypass the heater core 56, or partially through the heater core 56.

The HVAC air-handling assembly 30 includes a heater core 56 that receives a flow of air to be heated and a coolant fluid, which, in this example, is engine coolant as is known in the art. The heater core 56 heats the air by the thermodynamic transfer of heat from the coolant fluid. The flow of heated air leaves the heater core 56 and is received into a second chamber 57 within the HVAC air-handling assembly 30, and is distributed in a manner to be described. It should be appreciated that a wall of the HVAC case 32 may have an opening 33b to provide access to the second chamber 57 for a function to be described.

The HVAC air-handling assembly 10 also includes an air distribution door 60, in communication with a duct (not shown). The air distribution door 60 directs the flow of conditioned air from the evaporator core 48, or heater core 56, or a combination of both, into the duct for distribution in the occupant compartment 12, depending on the selected air distribution mode. In this embodiment, a first air distribution door 60a operatively directs the flow of now conditioned air through a panel duct (not shown) in the instrument panel or floor duct 64 and into the occupant compartment 12. A second air distribution door 60b operatively directs the flow of conditioned air through the panel duct or a defroster duct (not shown), and into the occupant compartment 12.

Preferably, the HVAC air-handling assembly 30 includes other component parts, such as plenums 58, 62, valves (not shown) and switches (not shown), which are conventional and known in the art to operatively transfer and condition the airflow.

Referring to FIGS. 5 through 9, a multi-zone temperature control system 70, according to the present invention, is illustrated in operational relationship with the HVAC air-handling assembly 30. The multi-zone temperature control system 70 is operatively coupled to the HVAC air-handling assembly 30, to receive conditioned air by either the heater core 56 or evaporator core 48 in order to provide individualized temperature control for the rear occupants of the vehicle 10. Advantageously, the multi-zone temperature control system 70 can be added onto the HVAC air-handling assembly 30.

The multi-zone temperature control system 70 includes a cold air supply duct 72. The cold air supply duct 72 is a generally rectangular member. An end of the cold air supply duct 72 includes a cold air inlet opening 74, in communication with an opening 33a in the HVAC case 32 to receive cooled air from the first chamber 49 after the evaporator core 48 in the HVAC air-handling assembly 30. In this example, the cold air supply duct 72 has a U-shape to receive cooled air from two locations within the HVAC air-handling assembly. The cooled air flows therethrough the cold air supply duct 72 in a manner to be described. The cold air supply duct 72 also includes a cold air egress opening 76, preferably located in a middle portion therein.

The multi-zone temperature control system 70 includes a hot air supply duct 78. Preferably, the hot air supply duct 78 is a generally rectangular member having a box-shape. A proximate end 80 of the hot air supply duct 78 is operatively coupled to the cold air egress opening 76 in the cold air supply duct 72. A distal end 82 of the hot air supply duct 78 is operatively coupled to a rear air duct 88, to be described. The hot air supply duct 78 includes a hot air ingress opening 84, in communication with an opening 33b in the HVAC case 32 to receive heated air from the second chamber 57 after the heater core 56.

The multi-zone temperature control system 70 includes a temperature blend door 86 operatively disposed within the hot air supply duct 78. The temperature blend door 86 controls the flow of heated air entering the hot air supply duct 78 from the HVAC air-handling assembly 30, to adjust the temperature of the flow of air, depending on the selected operational and temperature modes. It should be appreciated that the temperature blend door 86 may be actuated by an actuator (not shown). The temperature blend door 86 directs the flow of air between one hundred percent (100%) heated air, one hundred percent (100%) cooled air, and a mixture of heated and cooled air.

The multi-zone temperature control system 70 includes a rear air duct 88. A proximate end 90 of the rear air duct 88 is operatively coupled to the distal end 82 of the hot air supply duct 78. The rear air duct 88 directs the flow of conditioned air to the rear of the occupant compartment 12. A distal end 92 of the rear air duct 88 is connected to a vent (not shown) to direct the conditioned air into the rear of the occupant compartment 12. It should be appreciated that the cold air supply duct 72, hot air supply duct 78, and rear air duct 88 may be integrally connected as one piece.

Preferably, the multi-zone temperature control system 70 of this example provides tri-zone temperature control 94. For example, individual temperature control is available for the front driver-side section, front passenger-side section, and rear passenger section of the occupant compartment 12 of the vehicle 10. It should be appreciated that a center portion of the rear air duct 88 may be split into two sections, to package the rear air duct 88 around a transmission shift lever (not shown) or the like.

The multi-zone temperature control system 70 is operatively connected to the HVAC air-handling assembly 30 such that the cold air inlet opening 74 in the cold air supply duct 72 is in fluid communication with the first chamber 49 in the HVAC air-handling assembly 30 containing cooled air from downstream of the evaporator core 48. The cooled air is diverted through the opening 33a in the case 32 and the cold air inlet opening 74 in the cold air supply duct 72. Further, the multi-zone temperature control system 70 is operatively connected to the HVAC air-handling assembly 30, such that the hot air ingress opening 84 in the hot air supply duct 78 is in fluid communication with the second chamber 57 in the HVAC air-handling assembly 30 containing heated air downstream from the heater core 56. The heated air is diverted through the opening 33b in the case 32 and the hot air ingress opening 84, and into the hot air supply duct 78.

In operation, cooled, conditioned air from after the evaporator core 48 is diverted through the cold air inlet opening 74 in the cold air supply duct 72. The cooled air flows through the cold air supply duct 72 and into the hot air supply duct 78. At the same time, heated conditioned air from the heater core 56 is diverted into the hot air ingress opening 84 in the hot air supply duct 78. The temperature blend door 86 directs the quantity of cooled air and heated air, between full heated air, full cooled air, or a mixture therebetween, to adjust the temperature of the air. The temperature adjusted air flows through the rear air duct 88 and out of the rear vent for distribution within the rear of the occupant compartment 12.

Figure 7:
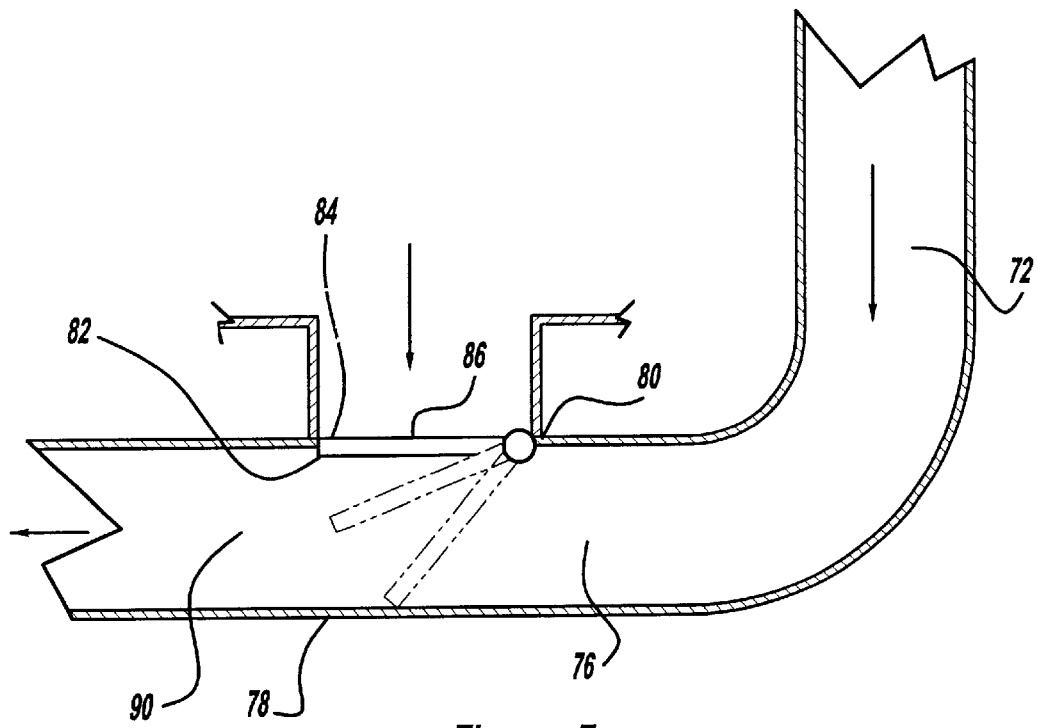
FIG. 7 is a sectional view taken along line 7—7 of FIG. 6 illustrating airflow through the multi-zone temperature control system.
Figure 8:
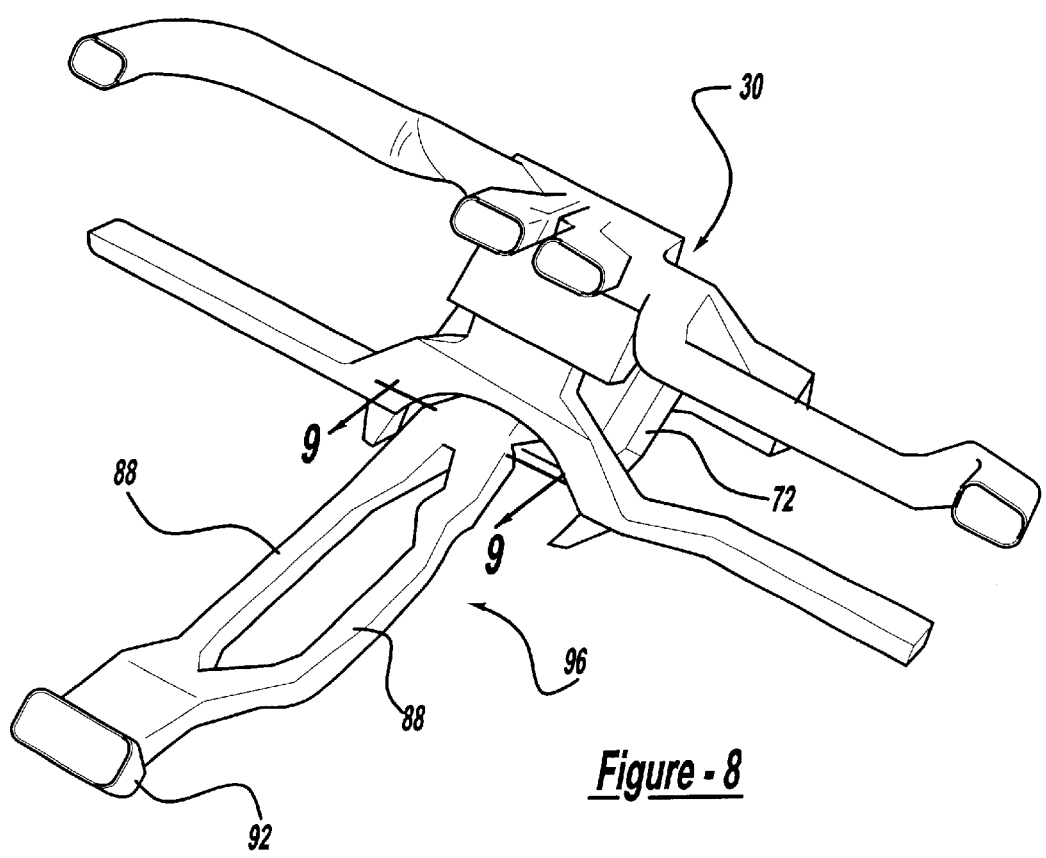
FIG. 8 is a perspective view of another embodiment, according to the present invention, of the multi-zone temperature control system of FIG. 5.
Figure 9:
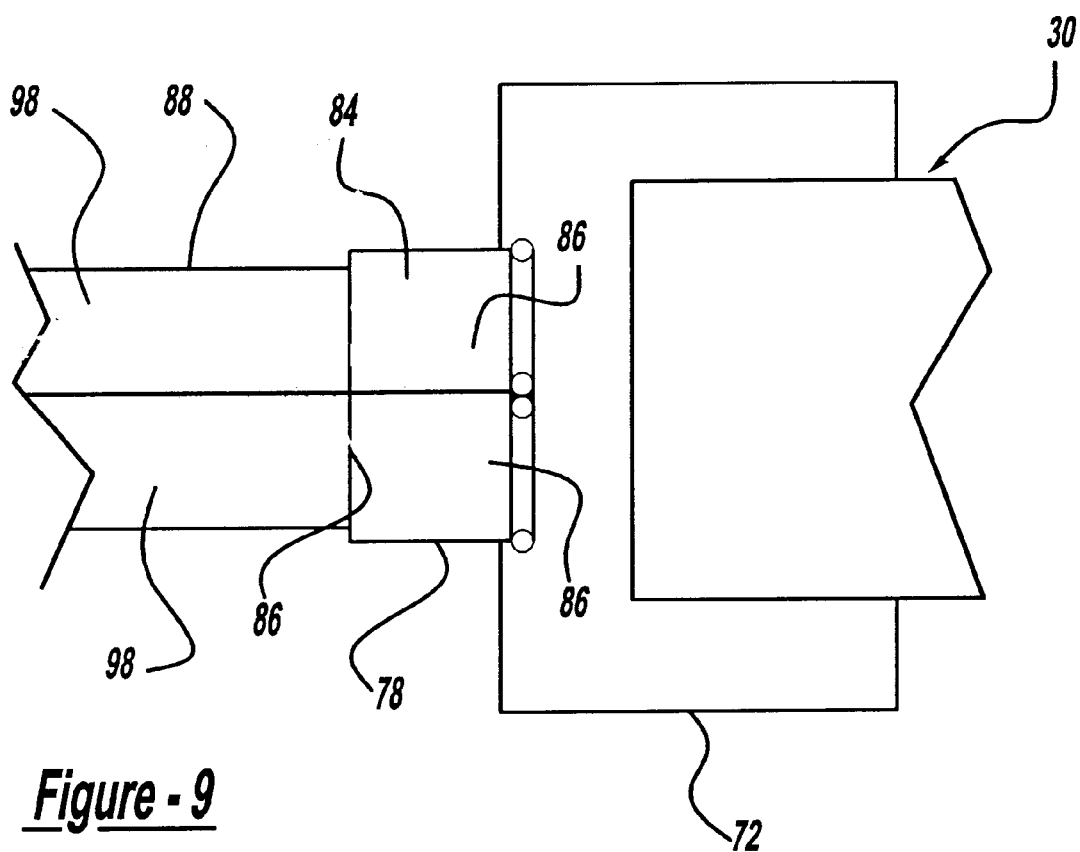
FIG. 9 is a sectional view taken along line 9—9 of FIG. 8 illustrating airflow through the multi-zone temperature control system.

Referring to FIGS. 7 and 8, another embodiment, according to the present invention, of the multi-zone temperature control system 96, providing quad-zone temperature control, is illustrated. In addition to front passenger-side section and front driver-side section individual temperature controls, there is right rear passenger and left rear passenger individual temperature controls. In this embodiment for quad-zone temperature control, the multi-zone temperature control system 96 includes the rear air duct 88 partitioned into two chambers 98. The hot air supply duct 78 includes two temperature blend doors 86, with each controlling the flow of air into the corresponding chamber 98 within the rear air duct 88. The operation of the multi-zone temperature control system 96 is similar to the multi-zone temperature control system 70.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A multi-zone temperature control system for a vehicle comprising:
    an HVAC air-handling assembly adapted to be disposed within the vehicle to condition a flow of air, said HVAC air-handling assembly having a heater core to heat the flow of air and an evaporator core to cool the flow of air;
    a cold air supply duct connected to said HVAC air-handling assembly to receive cooled air from said evaporator core;
    a hot air supply duct connected to said HVAC air-handling assembly to receive heated air from said heater core and operatively coupled to said cold air supply duct to receive the cooled air from said cold air supply duct;
    a rear air duct operatively coupled to said hot air supply duct to receive conditioned air from said hot air supply duct and direct a flow of the conditioned air from said hot air supply duct to a rear of an occupant compartment of the vehicle; and
    a temperature blend door disposed within said hot air supply duct to control a flow of heated air entering said hot air supply duct to adjust a temperature of the flow of the conditioned air through said rear air duct into the occupant compartment of the vehicle.

2. A multi-zone temperature control system as set forth in claim 1 wherein said cold air supply duct includes a cold air inlet opening in communication with a first opening in a case of said HVAC air handling assembly for receiving the cooled air.

3. A multi-zone temperature control system as set forth in claim 2 wherein said hot air supply duct includes a hot air ingress opening in communication with a second opening in the case of said HVAC air handling assembly for receiving the heated air.

4. A multi-zone temperature control system as set forth in claim 3 wherein said cold air supply duct has a general U-shape.

5. A multi-zone temperature control system as set forth in claim 1 wherein said rear air duct is partitioned into two chambers and said hot air supply duct includes two temperature blend doors that operatively control a flow of air therethrough each chamber, respectively.

6. A multi-zone temperature control system as set forth in claim 1 wherein said cold air supply duct, hot air supply duct and rear air duct are integrally connected as one piece.

7. A multi-zone temperature control system for a vehicle comprising:
- an HVAC air-handling assembly adapted to be disposed within the vehicle to condition a flow of air, said HVAC air-handling assembly having a heater core to heat the flow of air and an evaporator core to cool the flow of air and a case with a first opening to allow the cooled air from said evaporator core to exit therefrom and a second opening to allow the heated air from said heater core to exit therefrom;
- a cold air supply duct connected to said HVAC air-handling assembly to receive cooled air from said evaporator core;
- a hot air supply duct connected to said HVAC air-handling assembly to receive heated air from said heater core and operatively coupled to said cold air supply duct to receive the cooled air from said cold air supply duct;
- a rear air duct operatively coupled to said hot air supply duct to receive conditioned air from said hot air supply duct and direct a flow of the conditioned air from said hot air supply duct to a rear of an occupant compartment of the vehicle; and
- a temperature blend door disposed within said hot air supply duct to control a flow of the heated air entering said hot air supply duct to adjust a temperature of the flow of the conditioned air through said rear air duct and into an occupant compartment of the vehicle.

8. A multi-zone temperature control system as set forth in claim 7 wherein said cold air supply duct includes a cold air inlet opening in communication with said first opening in said case of said HVAC air handling assembly for receiving the cooled air.

9. A multi-zone temperature control system as set forth in claim 8 wherein said hot air supply duct includes a hot air ingress opening in communication with said second opening in said case of said HVAC air handling assembly for receiving the heated air.

10. A multi-zone temperature control system as set forth in claim 7 wherein said cold air supply duct has a general U-shape.

11. A multi-zone temperature control system as set forth in claim 7 wherein said rear air duct is partitioned into two chambers and said hot air supply duct includes two temperature blend doors that operatively control a flow of air throughout each chamber, respectively.

12. A multi-zone temperature control system as set forth in claim 1 wherein said cold air supply duct, hot air supply duct and rear air duct are integrally connected as one piece.

13. A multi-zone temperature control system for a vehicle comprising:
- an HVAC air-handling assembly adapted to be disposed within the vehicle to condition a flow of air, said HVAC air-handling assembly having a heater core to heat the flow of air and an evaporator core to cool the flow of air;
- a cold air supply duct connected to said HVAC air-handling assembly to receive cooled air from said evaporator core, wherein said cold air supply duct includes a cold air inlet opening in communication with a first opening in a case of said HVAC air handling assembly for receiving cooled, conditioned air;
- a hot air supply duct connected to said HVAC air-handling assembly to receive heated air from said heater core and operatively coupled to said cold air supply duct, wherein said hot air supply duct includes a hot air ingress opening in communication with a second opening in the case of the HVAC air handling assembly for receiving heated, conditioned air;
- a rear air duct operatively coupled to said hot air supply duct to receive conditioned air from said hot air supply duct and direct a flow of the conditioned air from said hot air supply duct to a rear of an occupant compartment of the vehicle; and
- a temperature blend door disposed within said hot air supply duct to control a flow of the heated air entering said hot air supply duct to adjust a temperature of the flow of the conditioned air through said rear air duct and into the occupant compartment of the vehicle, wherein said cold air supply duct, hot air supply duct and rear air duct are integrally connected as one piece.

* * * * *